(12) United States Patent
Carey et al.

(10) Patent No.: US 10,223,147 B2
(45) Date of Patent: Mar. 5, 2019

(54) RESOURCE ALLOCATION IN HIGH AVAILABILITY (HA) SYSTEMS

(71) Applicant: INTERNATIONAL BUSINESS MACHINES CORPORATION, Armonk, NY (US)

(72) Inventors: James E. Carey, Rochester, MN (US); Bryan Jones, Rochester, MN (US); Aditi Rajagopal, Rochester, MN (US); Ryan L. Rossiter, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 15/241,953

(22) Filed: Aug. 19, 2016

(65) Prior Publication Data

US 2018/0054395 A1 Feb. 22, 2018

(51) Int. Cl.
*G06F 11/00* (2006.01)
*G06F 9/455* (2018.01)
*G06F 11/20* (2006.01)

(52) U.S. Cl.
CPC .......... *G06F 9/45558* (2013.01); *G06F 9/455* (2013.01); *G06F 11/2035* (2013.01); *G06F 11/2041* (2013.01); *G06F 11/2048* (2013.01); *G06F 2009/4557* (2013.01); *G06F 2009/45575* (2013.01); *G06F 2009/45591* (2013.01)

(58) Field of Classification Search
CPC ............. G06F 11/2041; G06F 11/2035; G06F 11/2048
See application file for complete search history.

(56) References Cited

U.S. PATENT DOCUMENTS

| 9,081,750 | B2 | 7/2015 | Dake et al. |
| 9,246,840 | B2 | 1/2016 | Anderson et al. |
| 2002/0174296 | A1* | 11/2002 | Ulrich ............... G06F 9/5083 711/114 |
| 2006/0195578 | A1* | 8/2006 | Ishida ............... G06F 9/5055 709/226 |
| 2006/0198507 | A1* | 9/2006 | Ishida ............... H04M 3/2227 379/221.09 |
| 2011/0029675 | A1* | 2/2011 | Yeow ............... G06F 11/2041 709/226 |
| 2016/0204923 | A1* | 7/2016 | Ashok ............... H04L 67/10 709/226 |

OTHER PUBLICATIONS

Mell, Peter, et al., "The NIST Definition of Cloud Computing", NIST Special Publication 800-145, Sep. 2011, Gaithersburg, MD, 7 pgs.
System and Method to Predict and Dynamically Adjust the Allocation of Resources for Cloud, IP.com No. IPCOM000225612D, Feb. 21, 2013, 9 pgs.

* cited by examiner

*Primary Examiner* — Charles Ehne
(74) *Attorney, Agent, or Firm* — David Woycechowsky; Hye Jin Lucy Song; Heslin Rothenberg Farley & Mesiti PC

(57) ABSTRACT

Methods, computer program products, and systems are presented. The methods include, for instance: designating virtual machines including resources as respective node to service computational tasks directed to a high availability cloud architecture system; a primary node suffering from a lack of resources gets more resources as borrowed from other nodes that are present as a fail-safe of the primary node; and a resource usage log is kept to determine whether or not the primary node needs resources from other nodes later.

20 Claims, 10 Drawing Sheets

RESOURCE ALLOCATION IN HIGH AVAILABILITY (HA) SYSTEMS

TECHNICAL FIELD

The present disclosure relates to resource allocation in high availability (HA) systems, and more particularly to methods, computer program products, and systems for performing dynamic resource allocation of temporary resources for compute services in the HA systems to improve performance of the HA systems.

BACKGROUND

In conventional high availability (HA) systems based on passive redundancy, a primary node may fail because of a lack of available resources even for a short period of time. When the primary node fails, a backup node should take over the primary node and performs as a new primary node. Such takeover process triggers a bottleneck in operations and services of the HA system, and consequently, performance of the HA system may decrease.

SUMMARY

The shortcomings of the prior art are overcome, and additional advantages are provided, through the provision, in one aspect, of a method. The method for a high availability cloud architecture system (HACAS) includes, for example: designating, by one or more processor of a computer, a first virtual machine including resources as a primary node of a first high availability (HA) set of the HACAS, and a plurality of additional virtual machines including respective resources, as respective backup nodes of the first HA set, wherein the HACAS includes one or more HA sets; determining that the primary node has more computational tasks than the primary node can reliably handle due to a lack of resources; responsive to the determining, borrowing, for the primary node, resources from one or more other nodes of the HACAS; and updating a resource usage log of the first HA set for later occurrences of the determining, wherein the HACAS is based on passive redundancy, whereby the HACAS uses excess capacity to reduce impact of HACAS component failures.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
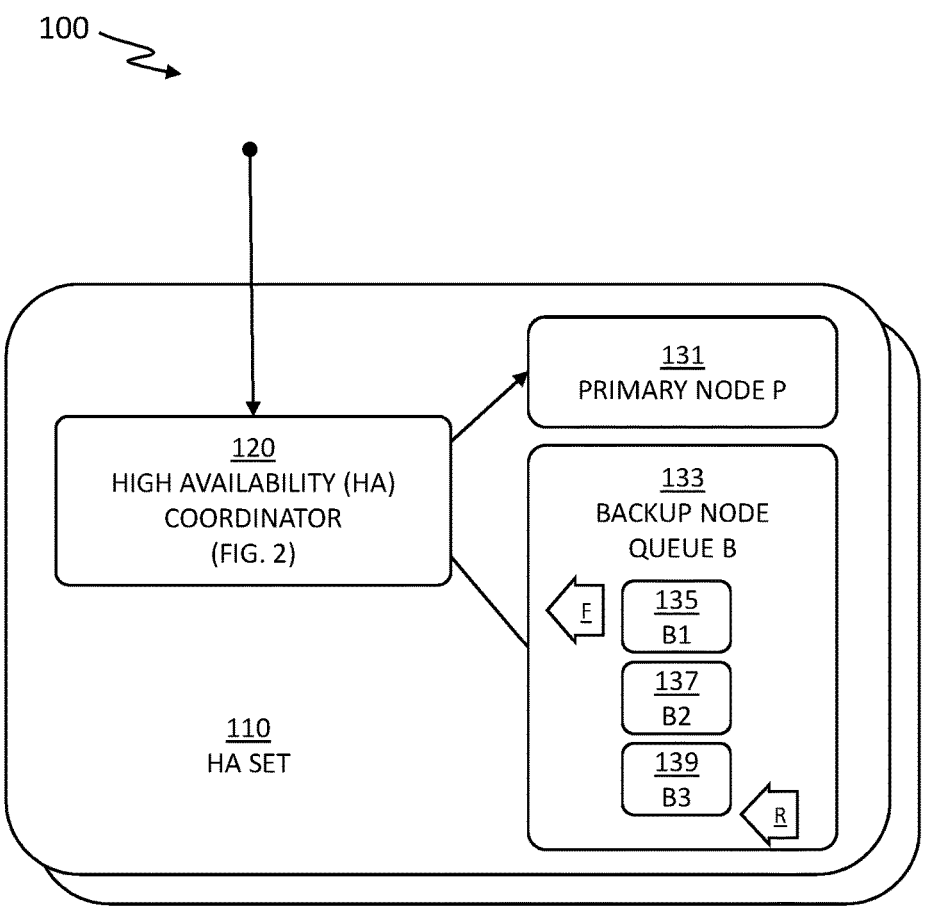
FIG. 1 depicts a simplified diagram for a high availability (HA) system, in accordance with one or more embodiments set forth herein.

FIG. 1 depicts a simplified diagram for a high availability (HA) system 100, in accordance with one or more embodiments set forth herein.

The high availability (HA) system 100 includes at least one high availability (HA) set including a HA set 110 that provides computation-oriented services, referred to as "compute services" in this specification, as a group. The HA set 110 includes a high availability (HA) coordinator 120, and nodes that run a respective compute process managing virtual machines (VM) instances to provide compute services. Each HA set of the HA system has a respective HA coordinator and compute nodes.

The HA set 110 includes a primary node P 131 and a backup node queue B 133, which includes a first backup node B1 135, a second backup node B2 137, and a third backup node B3 139. The backup node queue B 133 is a first-in-first-out (FIFO) data structure that is configured to enqueue a new node at the rear of the backup node queue B 133, represented by arrow R, and to dequeue a node to replace the primary node P 131 at the front of the backup node queue B 133, represented by arrow F. The backup nodes 135, 137, and 139 are kept in order of respective readiness states within the backup node queue B 133 according to a backup queue policy. In this specification, a readiness state of a backup node is determined based on a likelihood to use the backup node, as well as the backup queue policy. In this specification, the terms "backup queue policy" and "backup policy" are used interchangeably, to indicate a policy to manage the backup nodes in the backup node queue.

Each HA set in the HA system 100 may have respective number of backup nodes. In one embodiment wherein the HA system 100 includes two (2) HA sets, a first HA set may have three (3) backup nodes in a first backup node queue and a second HA set may have two (2) backup nodes in a second backup node queue. In the same embodiment, the three (3) nodes in the first backup node queue may have states of Hot Standby, Hot Standby, and Ready, respectively in that order, and the two (2) backup nodes in the second backup node queue may have respective readiness states of Hot Standby, and Ready, respectively in that order. See FIG. 4 and corresponding description for details of a state of a node.

Accordingly to a failure policy, if the primary node P 131 fails, the first backup node B1 135 at the front of the backup node queue B 133 is to be dequeued to take over the primary node P 131. If a node reinserted after a failure or otherwise participating in the backup node queue B 133 is inserted at the rear of the backup node queue B 133, following all existing backup nodes.

The primary node P 131, the first backup node B1 135, the second backup node B2 137, and the third backup node B3 139, are respective virtual machine nodes with dedicated resources that run a respective compute process for performing compute services for workloads incoming to the HA set 110. Examples of resources may include, processing time, memory space, storage space, etc. Resources for each node are pre-allocated for performing the compute services requested of the HA system 100. In conventional high availability systems, the resources allocated for respective backup nodes remain idle until the respective backup nodes become operational as a new primary for a HA set, upon which the resources would be used to process HA workloads.

The HA coordinator 120 is respectively coupled to the primary node P 131 and the backup node queue B 133, via one or more direct or indirect network connections, according to configurations of the HA system 100. Incoming workload to the HA coordinator 120 represented by an incoming arrow is sent to the primary node P 131 for processing. In other embodiments having two (2) or more HA sets, respective incoming workloads are directed to respective primary nodes of each HA set for processing.

The HA coordinator 120 tracks resource usage by the primary node P 131 during its operation. If the HA coordinator 120 is informed that the primary node P 131 may fail without more resources based on analyzing resource usage logs, the HA coordinator 120 may either temporarily allocate more resources to the primary node P 131 by borrowing from one of the backup nodes, 135, 137, and 139, or share the incoming workload with one of the backup nodes, 135, 137, and 139. The HA coordinator 120 also may reprioritize respective amount of resources allocated for the backup nodes, 135, 137, and 139, based on respective likelihood of use for the backup nodes, 135, 137, and 139. Detailed operations of the HA coordinator 120 are described in FIGS. 2, 3A, 3B, 3C, and 3D, and corresponding descriptions below. The HA system 100 is a passive redundancy system because the HA system 100 uses excess capacity to reduce impact of component failures. For example, if the primary node P 131 fails then the HA system 100 the excess capacity spared for the occasion to reduce impact of this failure. Advantages of performing the borrowing in a passive redundancy system (as opposed to an active redundancy system) may be, but not limited to, an immediate use of idle resources instead of negotiating resources in use, no need for monitoring and maintenance to achieve active redundancy, etc.

The HA coordinator 120 may adjust the amount of resources for respective backup nodes corresponding to respective readiness of nodes in the backup node queue 133, based on likelihood to use the respective node, such that the more likely for a backup node to become a primary node, that is, more likely to be used, the more resources the backup node is allowed to keep, and the less likely to use a backup node as a primary node, the more resource may be taken from the backup node to support the primary node presently suffering from a lack of resources. Within the respective HA sets, 130 and 150, nodes may be associated with differentiated likelihood of use values, or readiness value, and distinctive minimum resource requirements per respective backup policies for each HA set.

The HA coordinator 120 dynamically manages resources and/or workloads in a temporary basis in order to avoid bottlenecks caused when the primary node P 131 is overloaded such that the HA system 100 would perform regularly without performance fluctuation or frequent takeovers following a failure of the primary node 131 for a lack of resources, even in a stressed working condition.

In the present specification, the HA system 100 refers to a high availability cloud architecture system (HA CAS) based on passive redundancy for intended computation-oriented services, or compute service, as provided by the HA set 110. The HA system 100, implemented as the HA CAS is in accordance with the Infrastructure-as-a-Service (IaaS) cloud service provisioning model or a hybrid cloud offering multiple deployment models that may connect colocation (colo), managed and/or dedicated services with cloud resources. See FIGS. 4 through 7 and corresponding descriptions for cloud architecture system details. The term "high availability (HA)" indicates a system design approach and associated service implementation which ensure that a pre-arranged level of operational performance will be met, thus "high availability", during a contractual measurement period. High availability systems is typically utilized to minimize system downtime and data loss.

In conventional HA environment, in case a primary node reaches a failure point, one of backup nodes within the same HA set takes over the failing primary node and becomes a new primary node. The take-over by the backup node increases stress to the conventional HA environment, involving one or more cloud systems, because the take-over locks up significant amount of resources for transition, and consequently creates a bottleneck in which most processes in the HA environments suffer deteriorated performance or even temporary cessation of their operation during the take-over. The HA system 100, by use of the HA coordinator 120, dynamically reallocates resources and/or workloads such that the primary node may continue processing workloads without a take-over affecting all processes in the HA system 100.

In one embodiment of the present invention, the HA coordinator 120 is included in a compute management component of a cloud controller node that runs on an instance of a cloud operating system OpenStack® environment, which is an example of the high availability (HA) system 100 (OpenStack is an open source project licensed under the Apache License 2.0; OpenStack is a registered trademark of the OpenStack Foundation in the United States and other countries). In the same embodiment, the HA system 100 is referred to as a high availability cloud architecture system (HACAS).

In the same embodiment, all nodes 131, 135, 137, and 139 in the HA set 110 are respective compute nodes that run respective Nova compute daemon, that is a background process for computation, of the OpenStack environment. Nova is a project name for a compute service in an OpenStack environment, including responsibilities of spawning, scheduling, and decommissioning of virtual machines on demand, and the Nova compute daemon manages virtual machine (VM) instances which provide a wide range of services, such as web applications and analytics. A representative example of the VM instances may be a Kernel-based VM (KVM), a name of an OpenStack-supported hypervisor, which provides full virtualized solution for numerous hardware platforms, or hosts, which refer to physical machine as opposed to virtual machine nodes. In this specification, terms "backup node" and "secondary node" are used interchangeably. Also in this specification, terms "computational tasks", "workload" and "HA workload" are used interchangeably.

Some embodiments of the present invention may include one, or more, of the following operations, characteristics, features and/or advantages: (i) defining a first high availability cloud architecture system (HACAS), based on passive redundancy, including designating a first controller, in the form of a first virtual machine including resources, as a primary node of the first HACAS; (ii) determining that the primary node has more computational tasks than it can reliably handle; (iii) responsive to the determination that the primary node has more computational tasks than it can reliably handle, borrowing, by the primary node, computational resources from a set of other node(s); (iv) the set of other node(s) includes at least one secondary node of a second HACAS; and/or (v) the set of other node(s) includes at least one secondary node of the first HACAS.

Some embodiments of the present invention may include one, or more, of the following operations, characteristics, features and/or advantages: (i) defining a first high availability cloud architecture system (HACAS), based on passive redundancy, including designating a first controller, in the form of a first virtual machine including resources, as a primary node of the first HACAS; (ii) determining that the primary node has more computational tasks than it can reliably handle; (iii) responsive to the determination that the primary node has more computational tasks than it can reliably handle, offloading, by the primary node, work to set of other node(s); (iv) the set of other node(s) includes at least one secondary node of a second HACAS; and/or (v) the set of other node(s) includes at least one secondary node of the first HACAS.

Some embodiments of the present invention may include one, or more, of the following operations, characteristics, features and/or advantages: (i) defining a first high availability cloud architecture system (HACAS), based on passive redundancy, including: (a) designating a first controller, in the form of a first virtual machine including resources, as a primary node of the first HACAS, and (b) designating a plurality of additional controllers, respectively in the form of a virtual machines (VMs) respectively including resources, as secondary nodes of the first HACAS; (ii) determining, with respect to the secondary nodes, an order of readiness to accept work from the primary nodes; (iii) borrowing, by the primary node, resources of a least-ready secondary node, which ranks highest in the order of readiness to accept work from the primary node; (iv) offloading, by the primary node, work to a second most-ready secondary node, which ranks highest in the order of readiness to accept work from the primary node; (v) dynamic resource allocation in a HA (highly available) environment (in HA, a primary node is responsible for managing a workload and is assigned one or more secondary nodes that will "take over" in case the primary fails); (vi) application of dynamic resource allocation in real-time such that a primary node can borrow resources from its secondary nodes in case of a temporary high workload, or from the secondary nodes of another HA configuration; and/or (vii) acts to prevent node failure, and takes action to prevent node failure.

Figure 2:
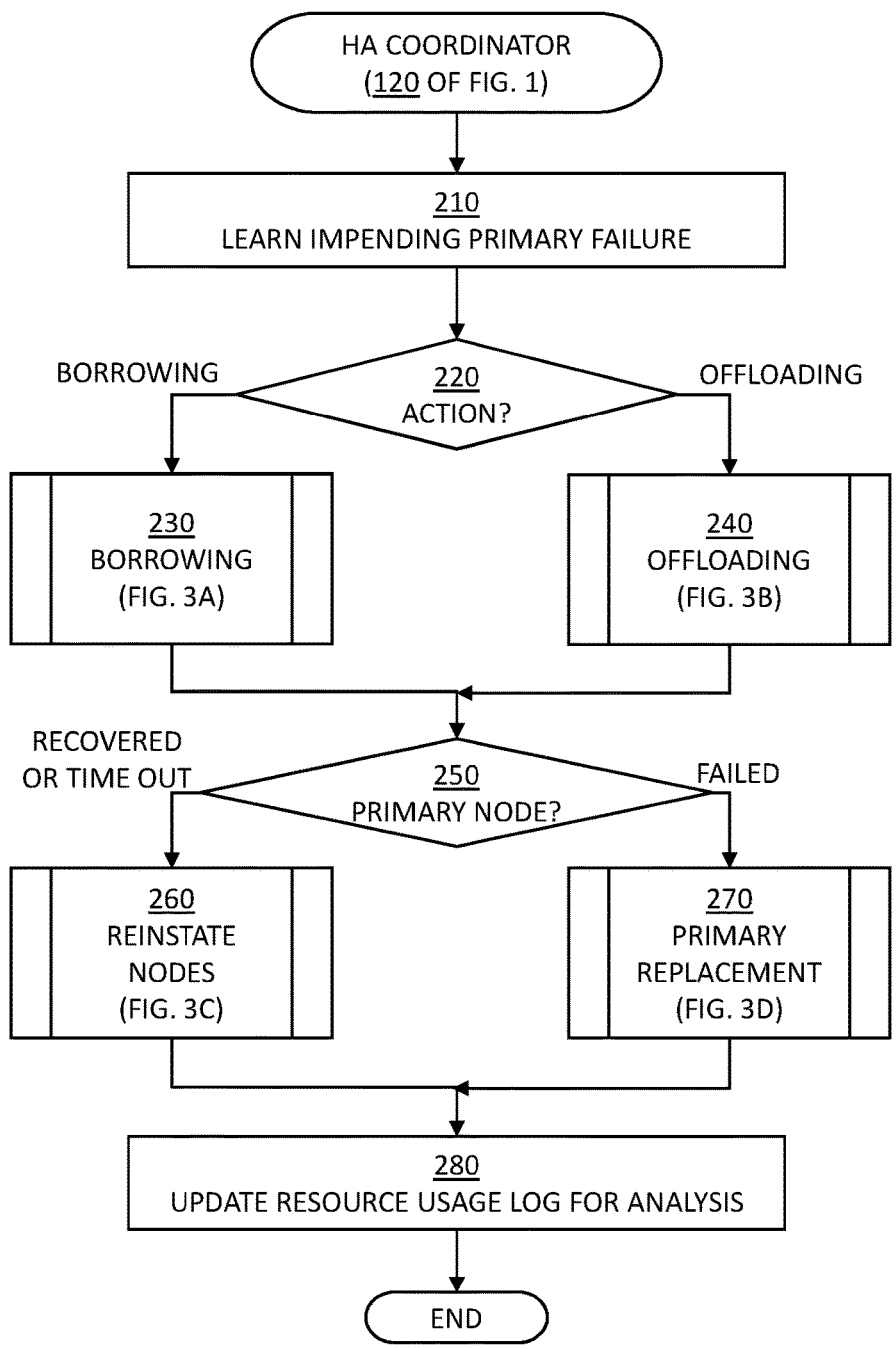
FIG. 2 depicts a top-level flowchart for the high availability (HA) coordinator of the HA system, in accordance with one or more embodiments set forth herein.

FIG. 2 depicts a top-level flowchart for the high availability (HA) coordinator 120 of FIG. 1, in accordance with one or more embodiments set forth herein.

In block 210, the HA coordinator 120 learns that the primary node 131 may fail because of a lack of resources in providing compute services, either by detecting based on analysis of a resource usage log, or by being notified by the primary node P 131. Then the HA coordinator 120 proceeds with block 220.

In block 220, the HA coordinator 120 determines an action to take in order to prevent the predicted failure of the primary node P 131, and to normalize the operation of the primary node P 131. If the HA coordinator 120 determines that borrowing resources from backup nodes to support the primary node P 131 is the best action, then the HA coordinator 120 proceeds with block 230. If the HA coordinator 120 determines that sharing workloads of the primary node P 131 with the backup nodes is the best action, then the HA coordinator 120 proceeds with block 240.

Figure 3A:
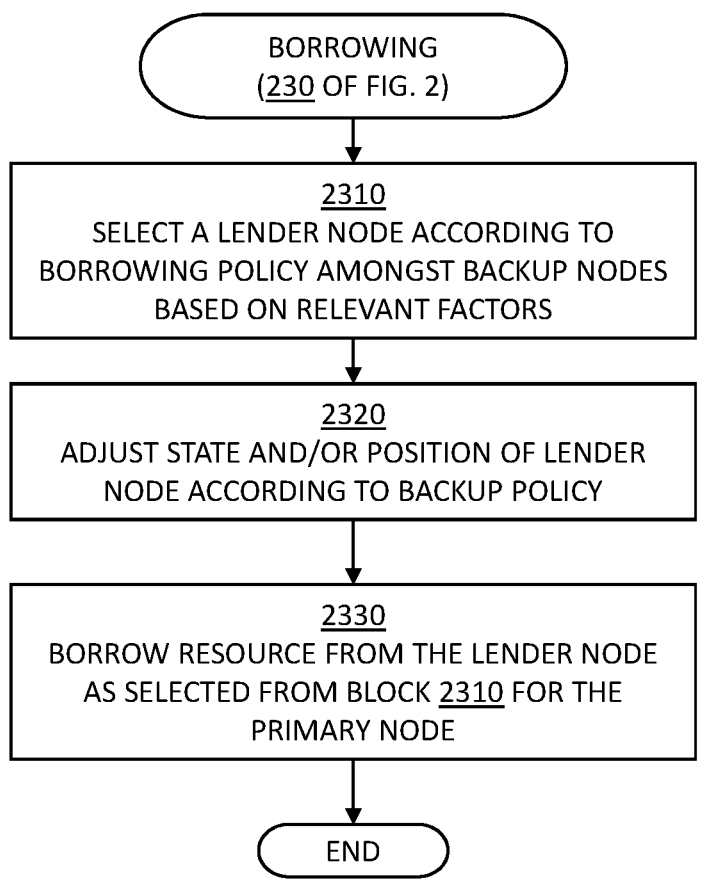
FIG. 3A depicts a flowchart of block 230 of FIG. 2, in which the HA coordinator borrows resources for primary node P from a backup node, in accordance with one or more embodiments set forth herein.

In block 230, the HA coordinator 120 borrows resources from a backup node and reallocates to the primary node P 131, as detailed in FIG. 3A and corresponding description. The HA coordinator 120 selects the backup node to borrow the resources from based on likelihoods to use respective backup nodes of the HA system 100 and respective backup queue policies, regardless of whether or not a backup node is in the same HA set as the failing primary node. Then the HA coordinator 120 proceeds with block 250.

Figure 3B:
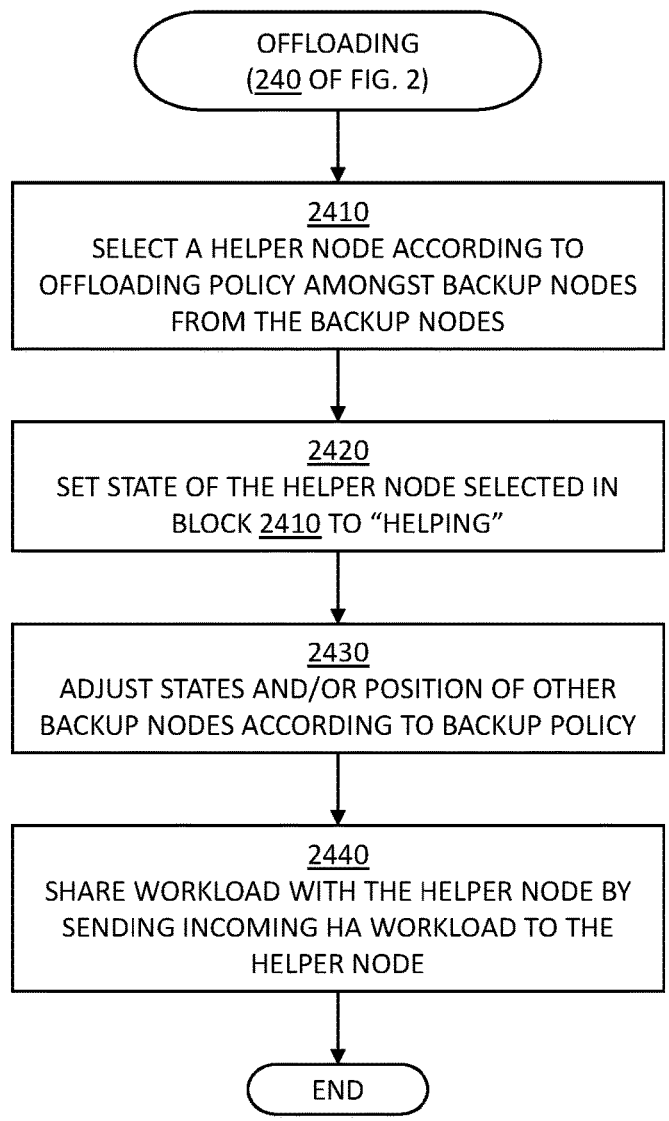
FIG. 3B depicts a flowchart of block 240 of FIG. 2, in which the HA coordinator redirects workloads of the primary node P to a backup node, in accordance with one or more embodiments set forth herein.

In block 240, the HA coordinator 120 off-loads the workloads of the primary node P 131 to one of the backup nodes of the HA system 100, as detailed in FIG. 3B and corresponding description. Then the HA coordinator 120 proceeds with block 250.

In block 250, the HA coordinator 120 determines whether or not the primary node P 131 had failed due to the impending failure as learned in block 210, nevertheless the measures taken in block 230 or 240. If the HA coordinator 120 determines that the primary node P 131 has recovered from the predicted failure in block 210, then the HA coordinator 120 proceeds with block 260. In the same embodiment of the present invention, the HA coordinator 120 may proceeds with block 260 even without detecting recovery of the primary node, upon expiration of a preconfigured time period for either resource lending and borrowing of block 230 or workload sharing of block 240, as blocks 230 and 240 are to operate in a temporary basis. In cases where the HA coordinator 120 proceeds with block 260, the primary node P 131 is in a state In Use. If the HA coordinator 120 determines that the primary node P 131 had failed, that is, the primary node P 131 is in a state Failed, then the HA coordinator 120 proceeds with block 270. Details of states of the nodes in the HA system 100 is presented in FIG. 4 and corresponding description.

Figure 3C:
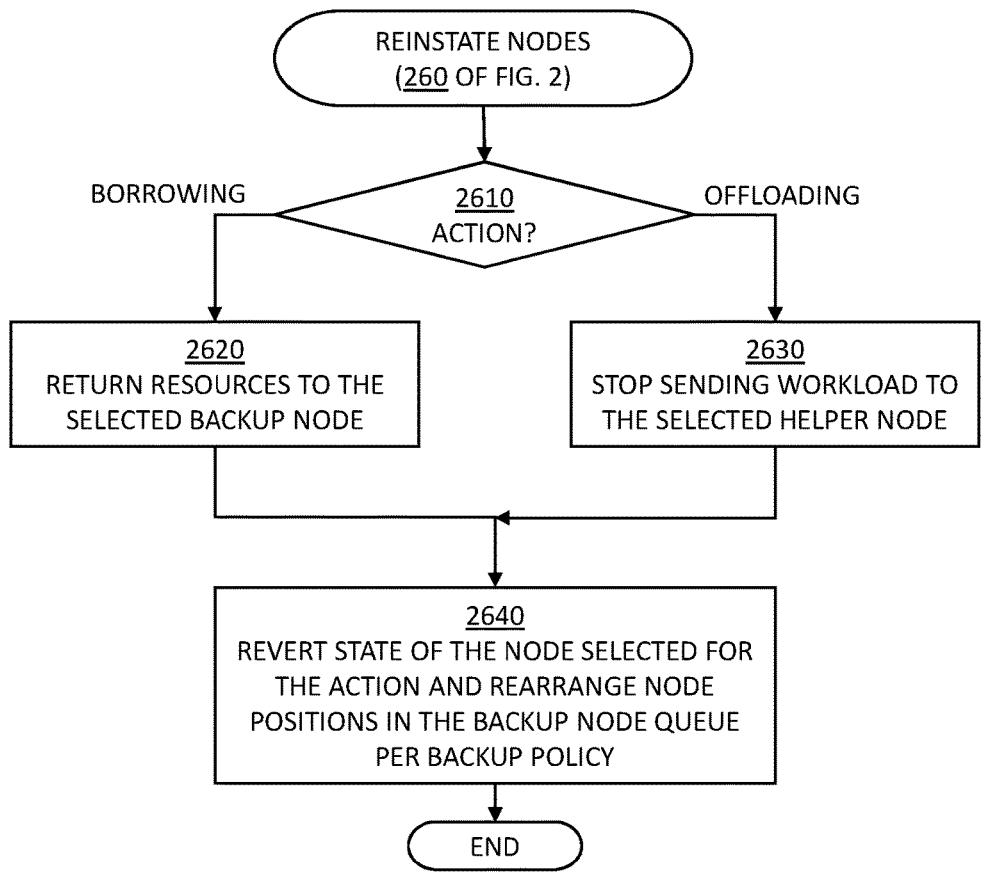
FIG. 3C depicts a flowchart of block 260 of FIG. 2, in which the HA coordinator reinstates states and resources of respective nodes, in accordance with one or more embodiments set forth herein.

In block 260, the HA coordinator 120 reinstates respective states of all nodes affected by either block 230 or block 240 to respective original states as being prior to either block 230 or block 240, as detailed in FIG. 3C and corresponding description. Then the HA coordinator 120 proceeds with block 280.

Figure 3D:
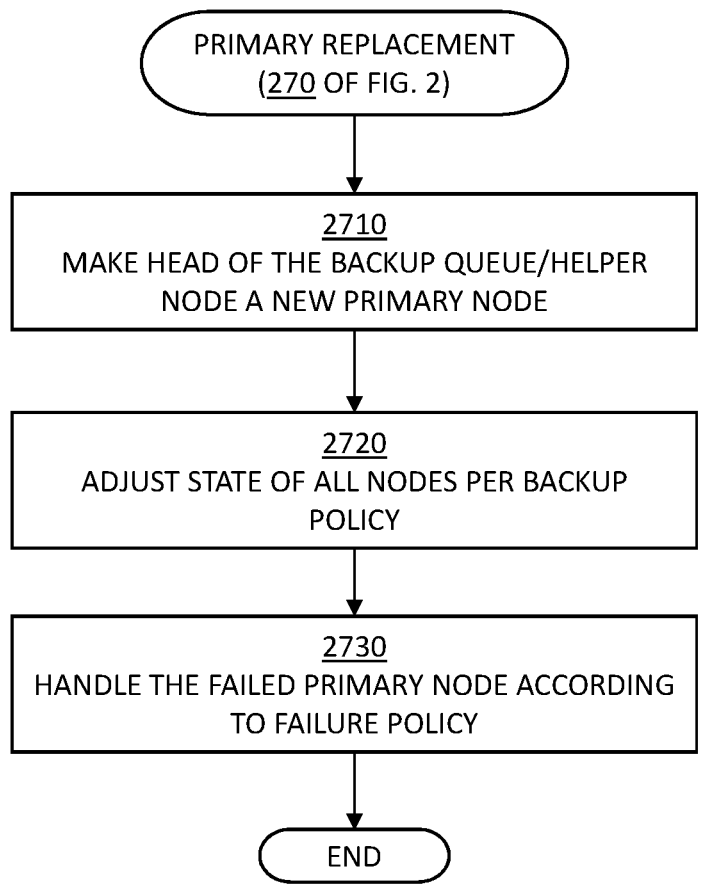
FIG. 3D depicts a flowchart of block 270 of FIG. 2, in which the HA coordinator replaces the primary node P after a node failure, in accordance with one or more embodiments set forth herein.

In block 270, the HA coordinator 120 replaces the primary node P 131 with the head of the backup nodes, as detailed in FIG. 3D and corresponding description. Then the HA coordinator 120 proceeds with block 280.

In block 280, the HA coordinator 120 updates the resource usage log to reflect the resource consumption in block 230 or block 240, to be later used for failure prediction, as necessary for the HA coordinator 120 in block 210. Then the HA coordinator 120 complete processing a cycle of HA response.

FIG. 3A depicts a flowchart of block 230 of FIG. 2, in which the HA coordinator 120 borrows resources for primary node P 131 from a backup node, in accordance with one or more embodiments set forth herein.

In block 2310, the HA coordinator 120 selects a lender node amongst all backup nodes of the HA system 100 according to a policy for borrowing, namely a borrowing policy, based on respective likelihood of use for each backup node. In one embodiment of the present invention, the policy for borrowing indicates to select a backup node that is least likely to be used amongst all backup nodes of the HA system 100 as a lender node. The borrowing policy may vary according to a current state of the HA system 100. For example, if the HA system 100 is presently undergoing an evaluation to move the HA system 100 into a higher level of availability, then the policy for borrowing may prevent borrowing of resources from the backup nodes. The HA coordinator 120 considers only backup nodes that have necessary resources for the primary node P 131 in selecting the lender node according to the borrowing policy. The lender node may or may not be selected from the HA set same as the primary node P 131 that is about to fail. The HA coordinator 120 may use historical failure information in determining respective likelihood of use for the backup nodes. The HA coordinator 120 may check locality of a candidate backup node, a virtual machine, when CPU processing time is necessary for the failing primary node P 131 because the CPU processing time may not be reallocated to a remote system. Accordingly, the HA coordinator 120 determines the amount and type of resources to be borrowed from the lender node as selected based on the necessary resources for the primary node P 131 and availability of the resources. The HA coordinator 120 may not be able to select any lender node for lack of available resources that are necessary for the primary node P 131, in which case the HA coordinator 120 terminates borrowing of block 230 and proceeds with block 250 of FIG. 2. Then the HA coordinator 120 proceeds with block 2320.

In one embodiment of the present invention, the HA coordinator 120 examines respective states of all backup nodes at the rear of the backup node queues to select the lender node. All nodes correspond to the respective states indicating respective likelihood of use for each backup node as well as respective readiness of the nodes, as detailed in FIG. 4 and corresponding description. In the same embodiment, the states of backup nodes are kept in two levels of readiness, Ready 303 and Hot Standby 304, of FIG. 4, respectively. In the same embodiment, backup nodes in states Ready are less likely to be used than backup nodes in states Hot Standby, and accordingly, the backup nodes in states Ready are positioned toward the end of respective backup node queues. The HA coordinator 120 checks only the backup nodes in states Ready in selecting the lender node, because the backup nodes in states Hot Standby should be fully ready to function as a primary node should the primary node P 131 fail, according to rules governing the HA system 100.

In block 2320, the HA coordinator 120 prepares borrowing of the resources from the lender node as selected by adjusting the state of the lender node, and/or the positions of the lender node in the backup node queue of the lender node. If the HA coordinator 120 had not selected any lender node in block 2310, then the HA coordinator 120 does not perform the aforementioned preparation. Then the HA coordinator 120 proceeds with block 2330.

In block 2330, the HA coordinator 120 reallocates the resources of the lender node as selected from block 2310 to the failing primary node P 131. Then the HA coordinator 120 proceeds with block 250 of FIG. 2.

FIG. 3B depicts a flowchart of block 240 of FIG. 2, in which the HA coordinator 120 redirects workloads of the primary node P 131 to a backup node, in accordance with one or more embodiments set forth herein.

In block 2410, the HA coordinator 120 selects a helper node that is a backup node according to a policy for offloading, namely, the offloading policy, based on respective likelihood of use for each backup node. In one embodiment of the present invention, the offloading policy indicates to select a backup node that is associated with the second-greatest likelihood of use, sparing a backup node with the greatest likelihood of use for a possible primary replacement. The offloading policy may indicate to select the backup node with the greatest likelihood of use if there is only one (1) backup node available or if a backup node that is associated with the second-greatest likelihood of use is unable to process workloads. In one embodiment of the present invention, the backup nodes are ordered in the backup node queue B 133 by respective likelihoods of use such that a backup node that is second likely to be used is immediately following the head of the backup node queue. Because the primary node P 131 may fail as discovered in block 210 of FIG. 2, the first backup node B1 135 at the head of the backup node queue B 133 stands by to take over in case of the failure of the primary node P 131, without participating in the offloading 240 of FIG. 2. Accordingly, in the same embodiment, the HA coordinator 120 selects the second backup node B2 137 as the helper node for offloading. Then the HA coordinator 120 proceeds with block 2420.

In block 2420, the HA coordinator 120 sets the state of the helper node as selected in block 2410 to Helping, to represent that the selected helper node shares HA workload of the primary node P 131. In embodiments wherein the selected node is in a state Hot Standby, the state is directly set to Helping. In embodiments wherein the selected node is in a state Ready, the state is set to Helping via a state Hot Standby. Then the HA coordinator 120 proceeds with block 2430.

In block 2430, the HA coordinator 120 adjusts states and/or positions of affected backup nodes in the same backup node queue as the helper node selected in block 2410 according to a backup policy of the HA system 100. For example, after the helper node is selected for the offloading, if the backup policy dictates that the helper node may not count as one of the backup nodes, then the HA coordinator 120 may need to add a new backup node to the backup node queue. In case where the backup policy of the HA system 100 dictates that each HA set in the HA system 100 should have one (1) backup node in a state Hot Standby and one (1) or two (2) backup nodes in a respective state Ready, if the backup node queue had two (2) backup nodes in respective states Ready before selecting the helper node in block 2410, then the HA coordinator 120 only need to adjust the position of the remaining backup node in the backup node queue, according to the backup policy. Then the HA coordinator 120 proceeds with block 2440.

In block 2440, the HA coordinator 120 shares the HA workload of the primary node P 131 with the helper node by sending the HA workload incoming to the HA set 110 to the helper node. The offloading to the helper node continues until further state change is triggered by the HA coordinator 120. Then the HA coordinator 120 proceeds with block 250 of FIG. 2.

FIG. 3C depicts a flowchart of block 260 of FIG. 2, in which the HA coordinator 120 reinstates states and resources of respective nodes, in accordance with one or more embodiments set forth herein.

In block 2610, the HA coordinator 120 determines from which action, either borrowing or offloading as determined in block 220 of FIG. 2, the nodes/resources are reinstated. If the HA coordinator 120 determines that the nodes are recovering from the borrowing of FIG. 3A, then the HA coordinator 120 proceeds with block 2620. If the HA coordinator 120 determines that the nodes are recovering from the offloading of FIG. 3B, then the HA coordinator 120 proceeds with block 2630.

In block 2620, the HA coordinator 120 returns the resources, which had been reallocated to the primary node P 131 in block 2330 of FIG. 3A, back to the lender node that originally had the resources prior to block 2310 of FIG. 3A. Then the HA coordinator 120 proceeds with block 2640.

In block 2630, the HA coordinator 120 discontinues sending the incoming HA workload to the helper node selected in block 2410 of FIG. 3B, and begins directing the HA workload back to the primary node P 131. Then the HA coordinator 120 proceeds with block 2640.

In block 2640, the HA coordinator 120 reverts respective states of the nodes that had participated in or been affected by the borrowing or the offloading and rearranges the backup node queue according to the backup policy. Then the HA coordinator 120 proceeds with block 280 of FIG. 2.

FIG. 3D depicts a flowchart of block 270 of FIG. 2, in which the HA coordinator 120 replaces the primary node P 131 after a node failure, in accordance with one or more embodiments set forth herein.

In block 2710, the HA coordinator 120 makes a backup node at the head of the backup node queue a new primary node. As noted, the head backup node is kept in a state Hot Standby according to the backup policy. Or, if there is a helper node which currently handles incoming HA workload within the same HA set as the primary node, the HA coordinator 120 makes the helper the new primary node. If the helper node had been selected from another HA set, namely a second HA set, then the HA coordinator 120 of the first HA set would negotiate with a HA coordinator of the second HA set from which the helper node is selected, in order to indefinitely keep the helper node with the first HA set. Then the HA coordinator 120 proceeds with block 2720.

In block 2720, the HA coordinator 120 adjusts respective states of all nodes according to the backup policy. In the same embodiment as FIGS. 3A and 3B, a state corresponding to the new primary node would be changed to In Use from either Hot Standby or Helping, and following backup nodes in the backup node queue shall have a new head of the backup node queue of which state would be changed to Hot Standby from Ready. Then the HA coordinator 120 proceeds with block 2730.

In block 2730, the HA coordinator 120 handles the failed primary node according to a failure policy of the HA system 100. In one embodiment of the present invention, the failure policy may dictate to keep the primary node as is until proper failure analysis is performed. In another embodiment of the present invention, the failure policy may make a failure log for future analysis and reset the primary node in order to be inserted as a new backup node at the rear of the backup node queue. Then the HA coordinator 120 proceeds with block 280 of FIG. 2.

Figure 4:
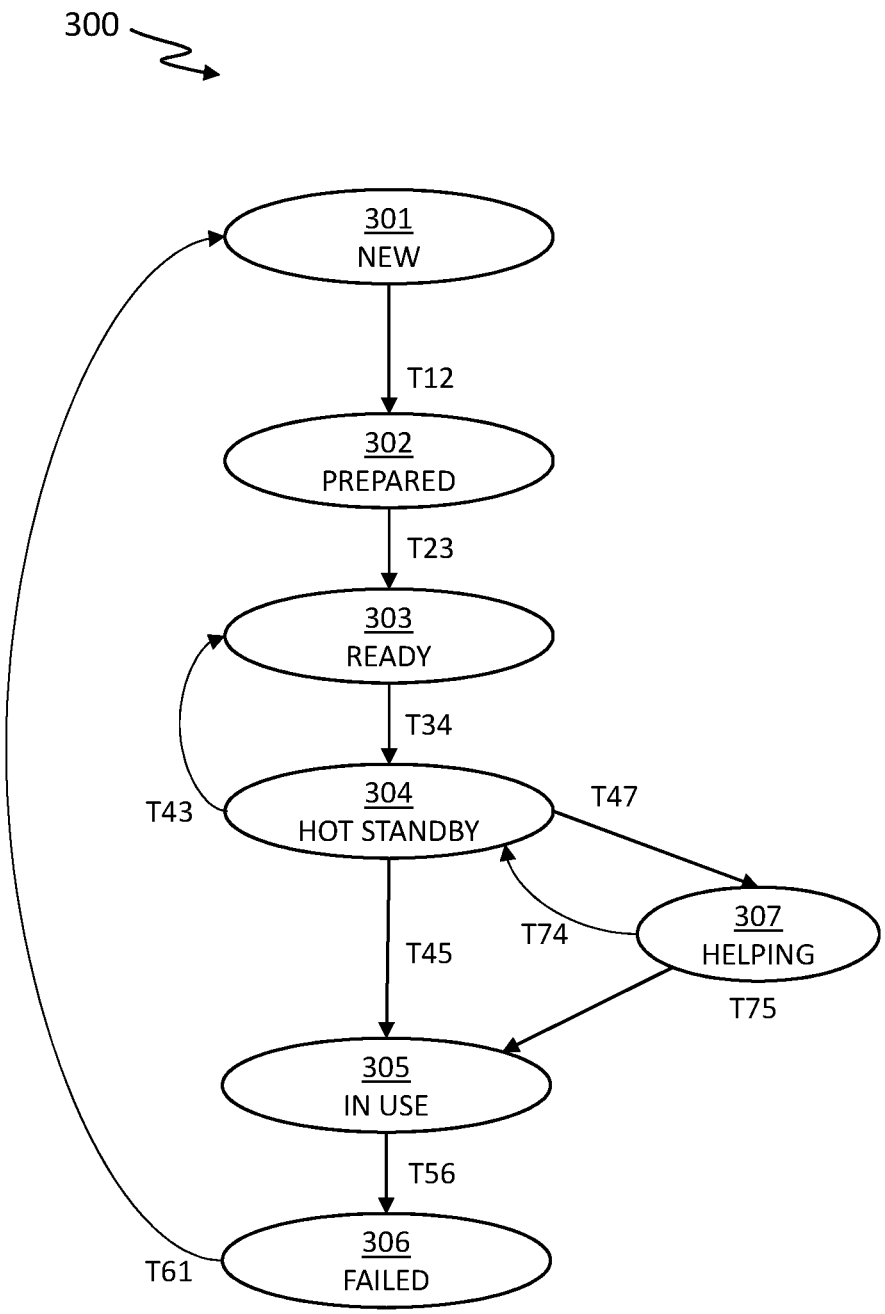
FIG. 4 depicts a state diagram of each node in the HA system 100 of FIG. 1, in accordance with one or more embodiments set forth herein.

FIG. 4 depicts a state diagram 300 of each node in the HA system 100 of FIG. 1, in accordance with one or more embodiments set forth herein.

Each node in the HA system 100 is in a state including a state New 301, a state Prepared 302, a state Ready 303, a state Hot Standby 304, a state In Use 305, a state Failed 306, and a state Helping 307. Each state indicate a stage in a lifecycle of a node in a HA set.

When a node is introduced to the HA system 100, the node is in state New 301. The node may be a newly created virtual machine, or a failed primary node after a reset, which transition is indicated in arrow T61. The node in state New 301 may proceed with state Prepared 302, which transition is indicated in arrow T12. The node state is set to Prepared 302 while getting ready for the HA system 100 according to predefined configuration for designated node function within the HA system 100. In the embodiments of the present invention, the node is configured as a compute node for processing HA workloads. The node in state Prepared 302 may proceed with state Ready 303, which transition is indicated in arrow T23.

For nodes in backup node queues of the HA system 100, the states of Ready 303 and Hot Standby 304 indicates respective levels of readiness and how likely the node is to be used as a primary node for a HA set in the HA system 100. In the embodiment described in FIGS. 3A and 3B, the states of backup nodes are kept in two (2) levels of readiness, Ready 303 and Hot Standby 304, where a backup node in state Ready 303 are less likely to be used than a backup node in state Hot Standby 304, and accordingly, the backup policy requires that the head of the backup node queue should be in state Hot Standby 304 at all times, with the rest of backup nodes either in state Hot Standby 304 or in Ready 303. According to a backup policy of the HA system 100, the node in state Ready 303 may proceed with state Hot Standby 304, which transition is indicated in arrow T34, as well as the node in state Hot Standby 304 may return to state Ready 303, which transition is indicated in arrow T43. Where the HA coordinator 120 adjusts states and/or positions of nodes within backup node queues, transitions represented by arrows T34 and T43 may occur, as described in block 2320 of FIG. 3A, block 2430 of FIG. 3B, block 2640 of FIG. 3C, and block 2720 of FIG. 3D.

When the node in Hot Standby 304 becomes one of primary nodes in the HA system 100, the node is set to state In Use 305, which transition is indicated in arrow T45. When the node fails, the state is set to Failed 306, which transition is indicated in arrow T56. State Failed 306 is used in block 250 of FIG. 2.

After the HA coordinator 120 determines to perform the offloading in block 220 of FIG. 2, the HA coordinator 120 selects a helper node in block 2410 of FIG. 3B. If the selected helper node is in state Hot Standby 304, the HA coordinator 120 sets the helper node to state Helping 307 in block 2420 of FIG. 3B, which transition is indicated in arrow T47. If the selected helper node is in state Ready 303, the HA coordinator 120 sets the helper node to state Hot Standby 304 and then to Helping 307 in block 2420 of FIG. 3B, which transitions are indicated in arrows T34 and T47.

When the HA coordinator 120 stops the offloading as the primary node has been recovered as determined in block 250 of FIG. 2, the state of the helper node in state Helping 307 may be reverted back to original state, either Ready 303, represented by arrows T74 and T43, or Hot Standby 304, represented by arrow T74, in block 2640 of FIG. 3C.

When the HA coordinator 120 determines to replace a failed primary node in block 250 of FIG. 2, the HA coordinator 120 replaces the primary node as described in FIG. 3D. If the node selected as a new primary node is in state Hot Standby 304, the HA coordinator 120 sets the selected new primary node to state In Use 305 in block 2720 of FIG. 3D, which transition is indicated in arrow T45. If the selected new primary node is in state Helping 307, the HA coordinator 120 sets the new primary node to state In Use 305 in block 2720 of FIG. 3D, which transition is indicated in arrow T75.

Certain embodiments of the present invention may offer various technical computing advantages, including avoiding a failure on a primary node of a high availability (HA) system caused by a lack of resources for the primary node. The HA system is implemented in a cloud platform, referred to as a high availability cloud architecture system (HACAS). Certain embodiments of the present invention implement lending of resources set aside for a backup node to the primary node such that a lack of resources suffered by the primary node may be relieved and consequently, improve performance of the HACAS by avoiding a bottleneck on operations of the HACAS that would be caused by the failure of the primary node.

Certain embodiments of the present invention enables offloading of HA workloads from the primary node to a backup node such that the primary node may be recovered from an impending workload stress while maintaining fail safe backup configuration of the HACAS by selecting a fully ready backup node that is not at the head of a backup node queue. Further, the same embodiments of the present invention, offer ways to improve performance of the HACAS by directing the HA workloads to the backup node prior to the failure of the primary node and by replacing the primary node with the backup node that is already functioning as a primary node by processing the redirected HA workloads, in case when the primary node fails. Further, certain embodiments of the present invention may improve efficiency and stability of a HA system by employing the HACAS which includes numerous HA sets as described herein such that the HACAS may choose either resource borrowing or offloading of the HA workloads based on respective merits of backup nodes from multiple backup node queues across all HA sets in the HACAS.

Figure 5:
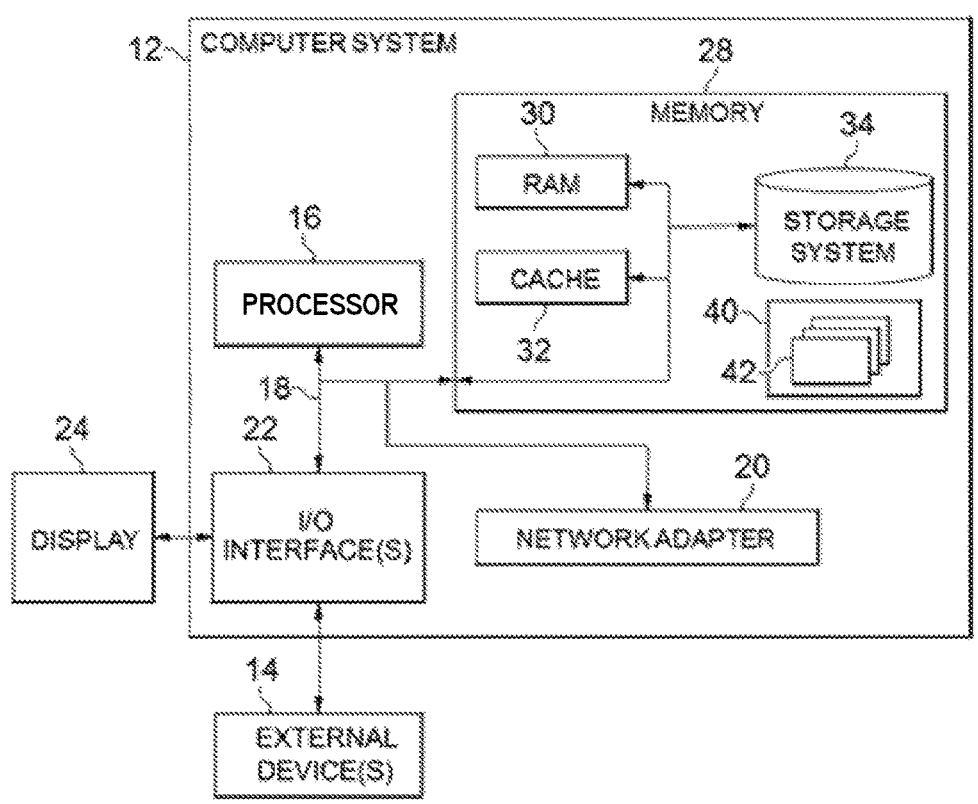
FIG. 5 depicts a cloud computing node according to an embodiment of the present invention.
Figure 6:
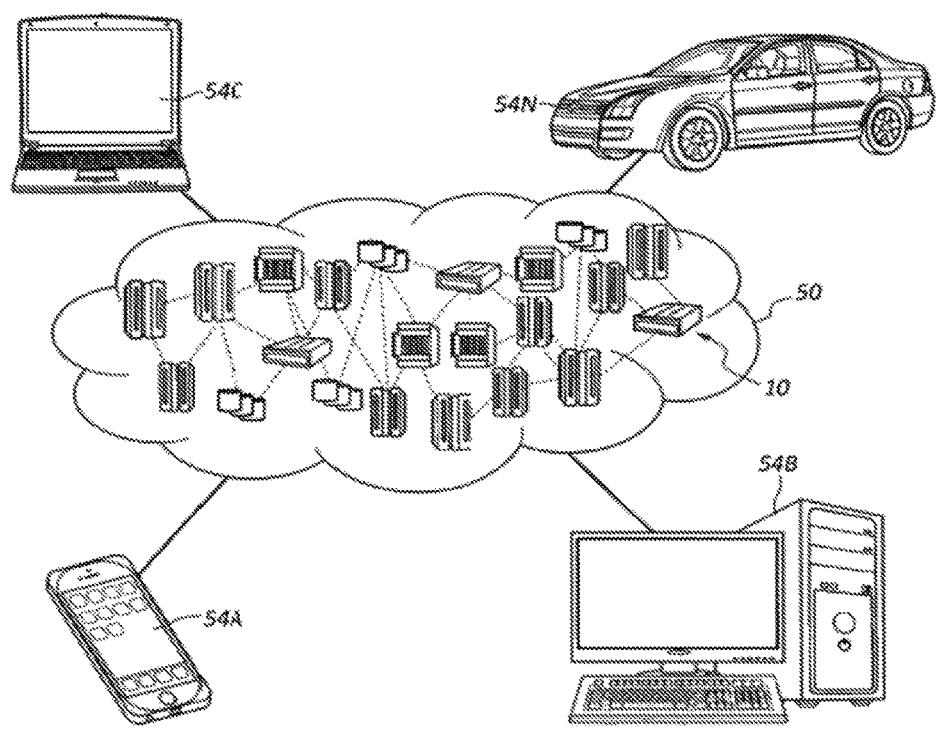
FIG. 6 depicts a cloud computing environment according to an embodiment of the present invention.
Figure 7:
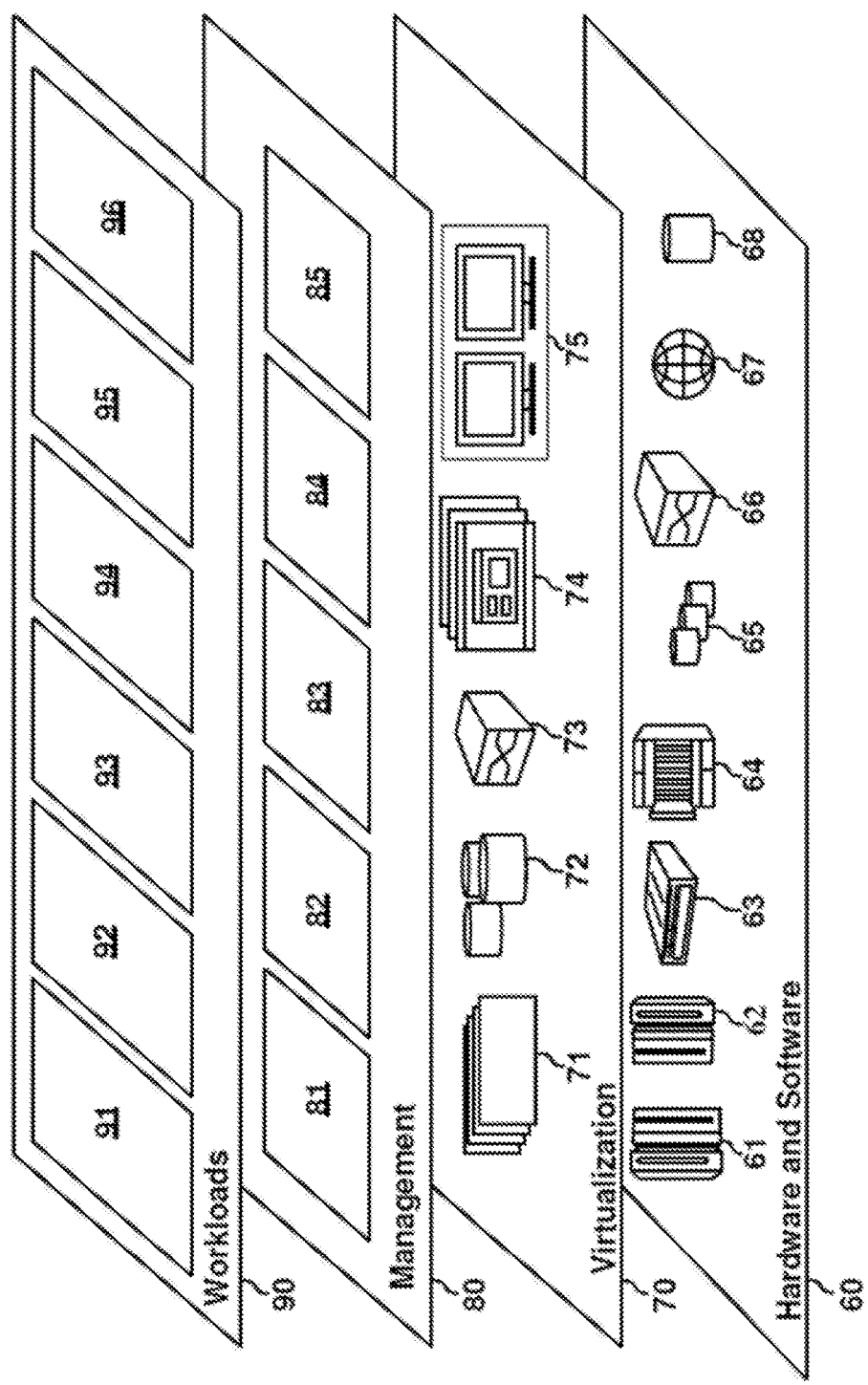
FIG. 7 depicts abstraction model layers according to an embodiment of the present invention.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms such as mobile phones, laptops, personal digital assistants (PDAs), etc.

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of high availability (HA) system of FIG. 1. Program processes 42, as in the HA coordinator 120 of FIGS. 2, 3A, 3B, 3C, and 3D and respective virtual machines implementing each node 131, 135, 137, and 139 of the HA set 110 of FIG. 1, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for a high availability cloud system architecture (HACAS) 96, as described herein. The processing components 96 can be understood as one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for a high availability cloud architecture system (HACAS), comprising:
designating, by one or more processor of a computer, a first virtual machine including resources as a primary node of a first high availability (HA) set of the HACAS, and a plurality of additional virtual machines including respective resources, as respective backup nodes of the first HA set, wherein the HACAS includes one or more HA sets;
determining that the primary node has more computational tasks than the primary node can reliably handle due to a lack of resources; and
responsive to the determining, borrowing, for the primary node, resources from one or more other nodes of the HACAS, the borrowing comprising:
selecting a lender node amongst all backup nodes of the HACAS having resources lacking from the primary node pursuant to a policy for the borrowing based on respective likelihood of use for each backup node; and
allocating the resources of the lender node to the primary node such that the primary node may reliably handle the computational tasks by use of the resources of the lender node,
wherein the HACAS is based on passive redundancy, whereby the HACAS uses excess capacity to reduce impact of HACAS component failures.

2. The computer implemented method of claim 1, wherein the lender node is selected from the backup nodes of the first HA set of the HACAS, and wherein the backup nodes of the first HA set are associated with respective likelihood of use, indicating how likely each backup node is to take over the primary node of the first HA set, in case the primary node of the first HA set fails.

3. The computer implemented method of claim 1, wherein the lender node is selected from backup nodes of a second HA set of the HACAS, wherein the backup nodes of the second HA set are respective virtual machines including respective resources, and wherein the backup nodes of the second HA set are associated with respective likelihood of use, indicating how likely each backup node is to take over a primary node of the second HA set, in case the primary node of the second HA set fails.

4. The computer implemented method of claim 1, further comprising:
ascertaining that the primary node is no longer in danger of failure due to the lack of resources; and
returning the resources allocated for the primary node from the allocating back to the lender node.

5. The computer implemented method of claim 1, further comprising:
ascertaining that a preconfigured time period for the borrowing had expired; and
returning the resources allocated for the primary node from the allocating back to the lender node.

6. The computer implemented method of claim 1, further comprising:
ascertaining that the primary node had failed; and
designating a first backup node that is associated with a greatest likelihood of use amongst the backup nodes as a new primary node of the first HA set of the HACAS;
adjusting respective likelihoods of use associated with rest of backup nodes according to a backup policy of the first HA set; and
handling the failed primary node according to a failure policy of the first HA set.

7. The computer implemented method of claim 1, wherein the respective likelihood of use associated with the backup nodes is selected from Ready and Hot Standby, Ready indicating less likely to be used to take over the primary node than Hot Standby, and wherein the lender node is associated with Ready and has the resources lacking from the primary node available.

8. The computer implemented method of claim 1, wherein the policy for the borrowing specifies that a likelihood of use for the lender node to take over the primary node is the least amongst the all backup nodes.

9. A computer implemented method for a high availability cloud architecture system (HACAS), comprising:
designating, by one or more processor of a computer, a first virtual machine including resources as a primary node of a first high availability (HA) set of the HACAS, and a plurality of additional virtual machines including respective resources, as respective backup nodes;
determining that the primary node has more computational tasks than the primary node can reliably handle due to a lack of resources; and
responsive to the determining, offloading the computation tasks incoming for the first HA set to one or more other nodes, the offloading comprising:
selecting a helper node amongst the backup nodes pursuant to a policy for the offloading based on respective likelihood of use for each backup node, wherein the backup nodes are associated with respective likelihood of use, indicating how likely each backup node is to take over the primary node of the first HA set, in case the primary node fails; and
sending the computational tasks incoming for the first HA set to the helper node for processing such that the primary node may not fail by use of the helper node,
wherein the HACAS is based on passive redundancy, whereby the HACAS uses excess capacity to reduce impact of HACAS component failures.

10. The computer implemented method of claim 9, wherein the helper node is selected from the first HA set of the HACAS.

11. The computer implemented method of claim 9, further comprising:
ascertaining that the primary node has recovered from the lack of resources in the determining; and
discontinuing the sending and resuming directing the computational tasks incoming for the first HA set to the primary node.

12. The computer implemented method of claim 9, further comprising:
ascertaining that the primary node had failed and that the helper node is in the first HA set; and
designating the helper node that is currently handling the computational tasks incoming for the first HA set as a new primary node of the first HA set of the HACAS;
adjusting respective likelihoods of use associated with rest of backup nodes according to a backup policy of the first HA set; and
handling the failed primary node according to a failure policy of the first HA set.

13. The computer implemented method of claim 9, wherein the respective likelihood of use associated with the backup nodes is selected from Ready and Hot Standby, Ready indicating less likely to be used to take over the primary node than Hot Standby, and wherein the helper node is associated with either Ready or Hot Standby pursuant to a backup policy of the first HA set.

14. The computer implemented method of claim 9, wherein the policy for the offloading specifies that a likelihood of use for the helper node to take over the primary node is the second greatest amongst the all backup nodes.

15. A system comprising:
a memory;
one or more processor in communication with memory; and
program instructions executable by the one or more processor via the memory to perform a method for a high availability cloud architecture system (HACAS), comprising:
a high availability (HA) coordinator in a controller node of a first HA set in the HACAS, wherein the HA coordinator manages a compute service that processes computational tasks with high availability basis, wherein operations by the HA coordinator comprise:
generating virtual machines and designating the virtual machines as respective compute nodes;
detecting whether or not the first compute node is about to fail;
determining an action to avoid a failure of the first compute node, wherein the action is selected from borrowing and offloading;
ascertaining whether or not the first compute node continues the compute service subsequent to taking the action from the determining; and
handling the first compute node and the additional compute nodes according to a preconfigured backup policy or a preconfigured failure policy, responsive to the ascertaining;
a first compute node performing the compute service within the first HA set on a first virtual machine with resources; and
one or more additional compute nodes on respective virtual machines with resources, being present in the first HA set as a fail-safe backup of the first compute node, wherein the HACAS includes one or more HA set including the first HA set, wherein the first compute node and the additional compute nodes are respectively associated with a readiness state selected from Ready and Hot Standby, Ready indicating less ready to perform the compute service than Hot Standby, wherein the additional compute nodes are in a queue and the preconfigured backup policy dictates that a head compute node positioned at the head of the queue is Hot Standby and that at least one more compute node be present in the queue.

16. The system of claim 15, wherein the action of borrowing is selecting a lender node that is the least ready from the queue according to a borrowing policy, and reallocating resources of the lender node to the first compute node such that the first compute node may not fail.

17. The system of claim 16, wherein the borrowing policy specifies that the HA coordinator to ascertain that the lender nodes is local to the first compute node, based on determining that a resource for the first compute node is CPU processing time.

18. The system of claim 15, wherein the action of offloading is selecting a helper node that is the second readiest from the queue according to an offloading policy, and directing the compute service to be performed by the first compute node to the helper node such that the first compute node may not fail while have the most ready compute node in the queue available.

19. The system of claim 18, wherein the preconfigured backup policy specifies that the HA coordinator to remove the selected helper node from the queue.

20. The system of claim 15, wherein the one or more processor runs OpenStack cloud operating system in implementing the HACAS, and the compute service is performed by use of Nova compute instance in the OpenStack, the first compute node and the one or more additional compute nodes are respective Kernel-based Virtual Machine (KVM) instances that runs respective Nova compute instances.

* * * * *